Sept. 6, 1960

C. E. WELLER 2,951,927

ELECTRIC SOLDERING IRON

Filed Aug. 21, 1958

INVENTOR
Carl E. Weller

BY Mason, Fenwick & Lawrence
ATTORNEYS

Sept. 6, 1960

C. E. WELLER 2,951,927

ELECTRIC SOLDERING IRON

Filed Aug. 21, 1958

INVENTOR
Carl E. Weller

BY Mason, Fenwick, & Lawrence
ATTORNEYS

Sept. 6, 1960 C. E. WELLER 2,951,927
ELECTRIC SOLDERING IRON
Filed Aug. 21, 1958 4 Sheets-Sheet 3

INVENTOR
*Carl E. Weller*
BY *Mason, Fenwick & Lawrence*
ATTORNEYS

Sept. 6, 1960     C. E. WELLER     2,951,927
ELECTRIC SOLDERING IRON Filed Aug. 21, 1958     4 Sheets-Sheet 4

INVENTOR
*Carl E. Weller*

BY
*Mason, Fenwick & Lawrence*
ATTORNEYS

United States Patent Office 2,951,927
Patented Sept. 6, 1960

2,951,927

ELECTRIC SOLDERING IRON

Carl E. Weller, 601 Stone's Crossing Road, Easton, Pa.

Filed Aug. 21, 1958, Ser. No. 756,435

10 Claims. (Cl. 219—26)

The present invention relates in general to electrically heated soldering irons, and more particularly to electrically heated soldering irons having an automatic temperature regulating facility.

Most electrically heated soldering irons heretofore commercially produced are so designed that their top temperature is determined by heat dissipation to the air by radiation, conduction and convection. Most conventional soldering irons are specifically designed to build up the radiation losses of the tool so that the heat losses through radiation to ambient air are sufficient when the unloaded soldering tip reaches a desired idling temperature that they are equal to and therefore balance out any additional heat delivered to the soldering tip by the heating element establishing an equilibrium condition whereby no further increase in the temperature of the soldering tip occurs. These radiation losses are built into conventional electrically heated soldering irons by providing a large mass and thus a large radiating area to produce the desired quantity of heat radiation for establishing the selected idling temperature. For example, conventional 60 watt soldering irons designed in this manner to have an idling temperature of about 650° F. would have a large shell surrounding the heating element and a large soldering tip to provide large radiating surfaces for dissipation of heat to the surrounding air. Such a tool will obviously have a high dissipation factor, meaning that the heating element is wasting a large portion of its heat, and of the input wattage, in heating the room and is producing little heat for the job of soldering. The heating element would, of course, remain seriously burdened by the necessity of supplying the heat for radiation losses when the soldering tip is quickly sapped of its heat by contact with the work and thus be unable to effectively keep the tip temperature up to the temperatures necessary for good soldering.

A soldering iron designed to be more efficient in supply of heat energy to the soldering tip may have an idling temperature of about 1000° F. and would have a reduced physical size and hence smaller radiation losses. Irons at these temperatures show quick and rapid deterioration of the soldering tip, requiring very frequent replacement. Additionally, such high-idling-temperature soldering irons would require highly skilled operators to avoid damage to components in the work area of the iron and to achieve a reliable solder joint, since the tip temperature is so high above solder melting temperature that great care must be exercised to avoid any movement of the parts to be bonded by the solder during the long cooling period down to solder freezing temperature.

A soldering iron having the input power responsive to the tip temperature can make available the advantages of both low idling temperature irons and high idling temperature irons without introducing their disadvantages.

The incorporation of thermostatic devices has been suggested from time to time to limit the top temperature of the soldering iron, including bimetals, linear expansion devices, air thermometers and thermocouples. To the best of my knowledge, these have never proved practical because of instability, short life, excessive cost, or failure to meet the basic requirement of controlling the temperature of the tip when used in the act of soldering.

An object of the present invention, therefore, is the provision of a novel electrically heated soldering iron having improved efficiency characteristics under working conditions.

Another object of the present invention is the provision of a novel electrically heated soldering iron having reliable temperature regulating means therein for controlling the energization of the soldering iron heating element to establish a selected idling temperature for the tool dependent upon the control properties of the regulating means rather than the heat radiation losses from the tool.

Another object of the present invention is the provision of a novel electrically heated soldering iron having temperature regulating means therein responsive to the temperature of the soldering tip for controlling the energization of the heating element to establish an idling temperature well below the idling temperature that would result solely from the heat dissipation characteristics of the tool whereby smaller size and mass and improved working economy may be realized without reduction in working efficiency.

Another object of the present invention is the provision of a novel electrically heated soldering iron having a device incorporated therein for regulating the idling temperature of the tool which has stable regulating properties providing reliable temperature regulation over a long period of time and which is relatively economical to manufacture.

Other objects, advantages and capabilities of the present invention will become apparent from the following detailed description, taken in conjunction with the accompanying drawings.

The present invention, in general, comprises a soldering iron having a soldering tip and an electrically energized heating element associated therewith to supply heat to the soldering tip. To provide for temperature control of the tool, an element made of temperature-sensitive ferromagnetic material having a Curie point in an appropriate temperature range, which will hereinafter be referred to as a "thermomagnetic material" for the sake of brevity, is disposed in intimate thermal contact with the soldering tip by placing the thermomagnetic element in the end of a bore formed in the soldering tip. Means are provided to utilize the characteristic of this thermomagnetic material to be ordinarily magnetic and to become substantially non-magnetic or of reduced magnetic strength when heated to a sufficiently high temperature by changes in temperature of the soldering tip to secure the desired control of the energizing circuit for the heating element and thereby establish an idling temperature, for example about 700° F., which may be well below the idling temperature which would result if dependent entirely upon the radiation losses designed into the tool. A specially designed control switch responsive to the temperature-related magnetic properties of the thermomagnetic element is provided in a special way to insure reliable regulation of temperature while providing long switch life. A specific structural relation of the parts is also incorporated to adapt the tool specifically to the desired temperature regulating scheme and to provide a soldering tool of considerably smaller size and mass having a soldering capacity comparable to much larger soldering tools having considerably greater wattage ratings.

In the accompanying drawings, showing some preferred embodiments of the invention by way of illustration:

Figures 5 and 6 are transverse section views taken along the lines 5—5 and 6—6, respectively, of Figure 3 illustrating portions of the control switch in elevation;

Figure 7 is a fragmentary longitudinal section view taken along the line 7—7 of Figure 2b and illustrating the elements of the control switch to enlarged scale with the switch in circuit closing condition;

Figure 9 is a transverse section view taken along the line 9—9 of Figure 2a;

Figure 10 is a fragmentary section view taken along the line 10—10 of Figure 1;

Figure 11 is a fragmentary plan view illustrating the coil reversing tab and the inner insulating layer 35a and heating element winding 36 associated therewith;

Figure 12 is a transverse section view taken along the line 12—12 of Figure 2a;

Referring to the drawings, wherein like reference characters designate corresponding parts throughout the several figures, and particularly to Figures 1 to 12 illustrating the first preferred embodiment of the present invention, the soldering iron, indicated generally by the reference character 10, includes a soldering tip 11 supported by an elongated barrel assembly 12 from a handle 13. The soldering tip 11 is, for example, formed of machined tellurium copper plated first with iron and then with nickel. The tip is plated to shield the copper tip, which is at elevated temperatures, from the atmosphere, molten solder, "acid" fluxes, and rosin or resin fluxes. Nickel plating is primarily used to exclude the atmosphere, and iron plating serves as a barrier against interchange of copper from the tip into solution with the molten solder. The soldering tip 11, as illustrated in Figure 2a, includes a cylindrical body portion 14 extending from the rear end thereof to a point forwardly of the longitudinal mid point of the tip 11, and a tapering outer portion 15 terminating at the forward end thereof in a chisel-shaped end 16. It should be understood, however, that the outer end of the tip 11 may be any configuration to suit the work. The soldering tip is provided with an axial bore 17 extending from the inner end thereof through the major portion of the cylindrical portion 14, together with a constricted bore extension 18 extending toward the chisel-shaped end 16 and terminating in a forwardly converging conical base 19. The bore 17 may have an entrance portion of slightly enlarged diameter and is provided with internal threads adjacent the inner end of the soldering tip 11 and the surfaces of the entire bore 17 and bore extension 18 are preferably plated to prevent scaling.

The soldering tip 11, in a preferred embodiment designed for a 60 watt soldering iron, may, for example, have a length of about 2½ inches and be formed from tellurium copper rod having a stock size diameter of .375 inch. The total length of the bore 17 and bore extension 18 in this preferred example may be slightly over 1½ inches and the diameter of the constricted bore extension 18 may be about ¼ inch.

A thermomagnetic control element 20 formed of a material which is normally magnetic and whose permeability is subject to substantial variation in relation to variation of the temperature to which it is exposed is seated in the bore extension 18 and extends slightly into the larger axial bore 17. The thermomagnetic control element 20 is preferably shaped to provide a larger diameter cylindrical portion 21 and a smaller diameter cylindrical portion 22 having a tapered end 23 adapted to extend into the conical portion 19, the larger and smaller diameter portions being connected by a tapered connecting wall. The smaller diameter portion 22 of the thermomagnetic control element 20 is of slightly smaller diameter than the diameter of the constricted bore extension 18 to facilitate introduction of the element 20 into the constricted bore extension 18, while the larger diameter cylindrical portion 21 very closely corresponds to the diameter of the constricted bore extension 18 to provide a tight friction fit between these surfaces for holding the thermomagnetic control element 20 in position within the soldering tip bore in extremely good thermal communication with the tip as discussed in detail hereafter.

An inner tube 24 lies in the bore 17 and extends from a point immediately adjacent the inner end of the thermomagnetic control element 20 to a point spaced toward the handle from the inner end of the soldering tip 11, the tip 11 being removably supported on this tube 24. The tube 24 has external threads 25 thereon onto which the internal threads at the entrance to the bore 17 are adapted to be threaded upon attachment of the tip 11, and a bushing portion 26 of annular form either integrally formed on the inner end of the tube 24 or constructed separately therefrom and brazed to the tube 24. A cap member 27 in the form of a flanged disk is fitted over the end of the tube 24 adjacent the thermomagnetic control element 20, the end portion of the exterior surface of the tube 24 being rabbeted to accommodate the flanges of the cap 27, the depth of the rabbet corresponding substantially to the thickness of the cap flange so that the outer surface of the cap flange lies substantially within the outer diameter of the tube 24. Both the cap 27 and tube 24 are preferably made of stainless steel, the cap being preferably of about .005 to .008 inch thickness. In any event, the tube 24 must be of non-magnetic material. The tube 24 may, in one preferred embodiment, have an inner diameter of about ⅕ inch and an outer diameter of ¼ inch and may be about 1½ inches in length.

A second tubular member, which will be hereinafter termed the element spool and is indicated by the reference character 28, surrounds the inner tube 24 in longitudinally coextensive, concentric relation therewith and is brazed at its inner end nearest the handle 13 to the bushing 26. The element spool may, for example, have an outer diameter of slightly over 4/10 inch and a wall thickness of about .012 inch. The outer end of the element spool 28 nearest the chisel-shaped end 16 of the soldering tip 11 is transversely aligned with the corresponding end of the tube 24 and supports an annular bushing 29 surrounding the outer end of the element spool 28, which serves as a spacer and supporting member for the forward end of an outermost tubular member, which will hereinafter be termed an element cover tube 30 which likewise extends in concentric relation with the element spool 28 and tube 24. The element cover tube 30 may have a length of about 2 inches and an outer diameter of about 5/10 inch. The rearmost end of the element cover tube 30 surrounds another annular bushing 31, which in turn surrounds the forward end of a tubular barrel 32 which extends rearwardly to and is secured in the handle 13 in a manner to be later described. The barrel 32, bushings 29 and 31, element cover tube 30 and element spool 28 are all preferably formed of stainless steel, the tubular elements 28, 30 and 32 being preferably secured to the adjacent surfaces of their associated bushings 29 or 31 by brazing. To this end, the bushings are each provided with rabbeted areas 33 to facilitate provision of the desired amount of brazing during manufacture. In the preferred 60 watt iron embodiment herein described, the barrel 32 may be about 2⅓ inches long and have an outer diameter of a little over 4/10 inch and a wall thickness of about .020 inch.

Figures 5, 6, 7, 9, 10, 11:
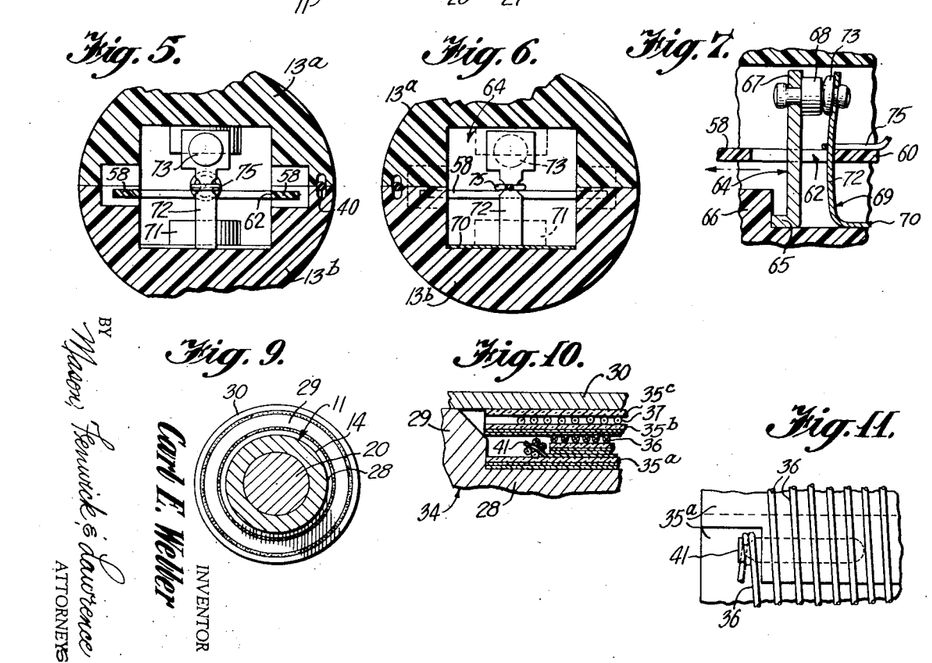
Figure 8:
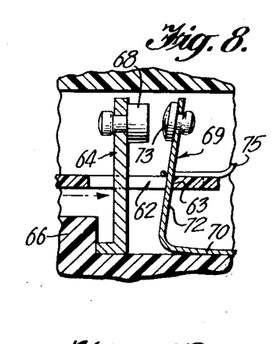
Figure 8 is a fragmentary section view similar to Figure 7 but illustrating the switch in circuit breaking condition.
Figure 12:
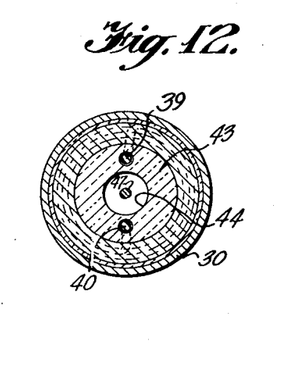

The annular chamber formed between the concentric element cover tube 30 and element spool 28 enclosed at its ends by the bushings 29 and 31 is occupied by the heating element of the soldering iron, indicated generally by the reference character 34, and comprising inner, intermediate and outer layers of insulating sheet material indicated generally by the reference characters 35a, 35b and 35c, respectively, the opposite ends of each of which are lapped in a conventional manner to form a group of concentric tubes. An inner winding layer 36 is formed between the insulating layers 35a and 35b and an outer winding layer 37 is formed between the insulating layers 35b and 35c which are wound from a continuous length of resistance wire, indicated generally by the reference character 38 having external leads 39 and 40 leading from the heating element assembly 34. The insulating layers 35a and 35b in the preferred embodiment herein described are each formed of a sandwich of two sheets of .0005–.001 high heat plain amber Phlogopite mica and one sheet of .002–.004 high heat corrugated amber Phlogopite mica. The outer layer 35c is a single sheet of the .002–.004 corrugated mica. The winding layers in the preferred 60 watt embodiment herein described may, for example, be spaced wound of 24 turns per layer of No. 36 B & S gauge Nichrome V wire 38 having a pitch of 28 turns per inch, the outer winding layer being space wound in a direction opposite to the inner winding layer so as to produce a cancellation of flux and form a non-inductive winding for a purpose to be later described. In practice, the inner and outer winding layers 36 and 37 forming the heating element must be anchored at each end of the winding in order to protect the space wound turns. The beginning point of the inner winding may be conveniently anchored on the inner insulating layer 35a by starting several tight turns of the wire 38, then forming a twist to, in effect, tie these turns down as, for example, by twisting the lead wire tightly around the wire extending from the last turn wound onto the element, and then proceeding to space wind the wire toward the forward end of the element spool. At the far end of the element spool, a stainless steel anchoring tab, indicated at 41 in Figures 10 and 11, is inserted between the lapped edges of the outer corrugated mica sheet in the inner insulating layer 35a, which may have a cut out opening through one corner thereof to expose the notched portions of the anchoring tab 41 and the Nichrome wire 38 is wound several tight turns over the shank of the anchoring tab to bind it in place and is then wound through the notches to anchor the end of the winding layer and form an anchor for reversal of the direction in which the coils are wound for the outer winding layer 37. The finish lead of the heating element is also anchored by inserting an anchor tab identical to the tab 41 in the lapped edges of the corrugated mica sheet forming the intermediate insulating layer 35b also having a cut out corner, lapping the wire 38 tightly over the shank of this finished lead anchor and then winding the wire 38 one turn or a plurality of turns through the notches of the anchoring tab before leading the wire away from the heating element.

The external leads 39 and 40 of the resistance wire 38 may be composed of four or five strands of the resistance wire twisted into a stranded lead so as to reduce the resistance of the leads and introduce as little heat into the handle as possible.

Figure 1:
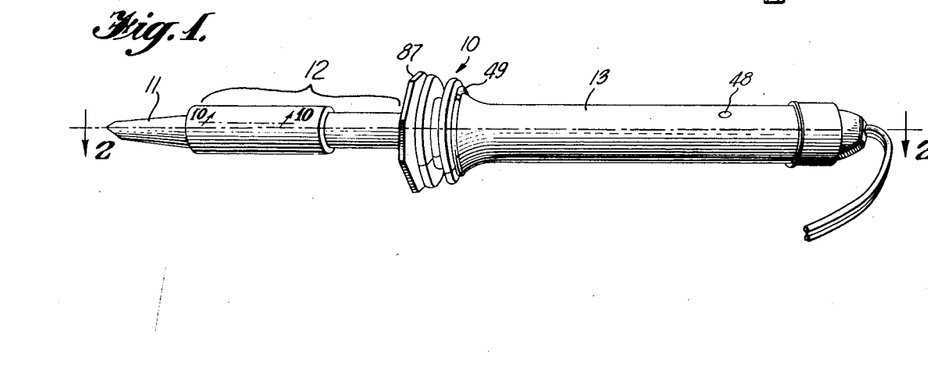
Figure 1 is a perspective view of an electrically heated soldering iron embodying the present invention.
Figure 2A:
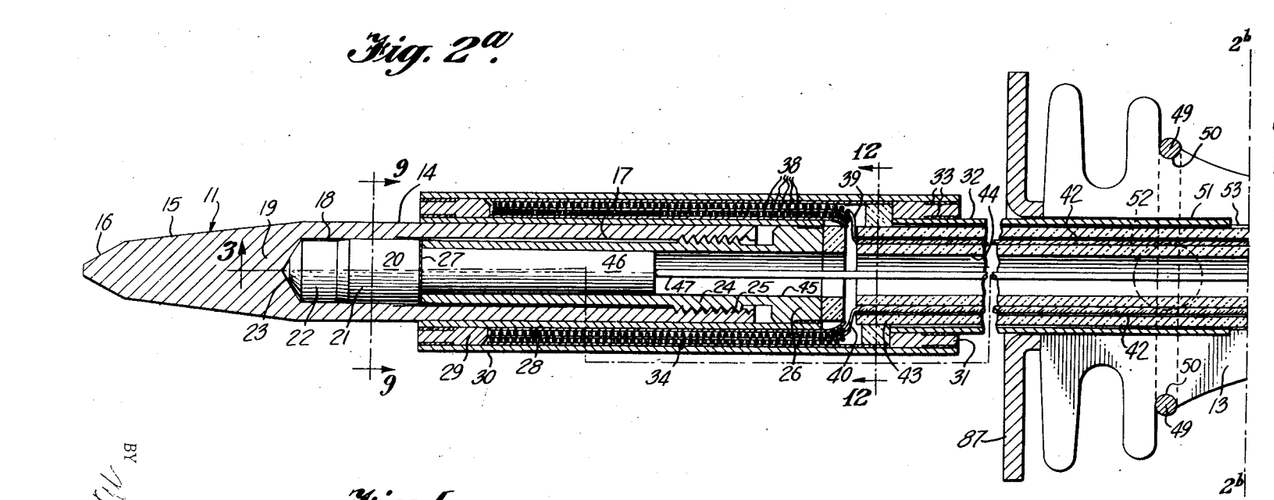
Figures 2a and 2b together constitute a longitudinal section view of the soldering iron taken along the line 2—2 of Figure 1, these figures being to considerably enlarged scale to facilitate illustration of the components of the soldering iron.
Figure 2B:
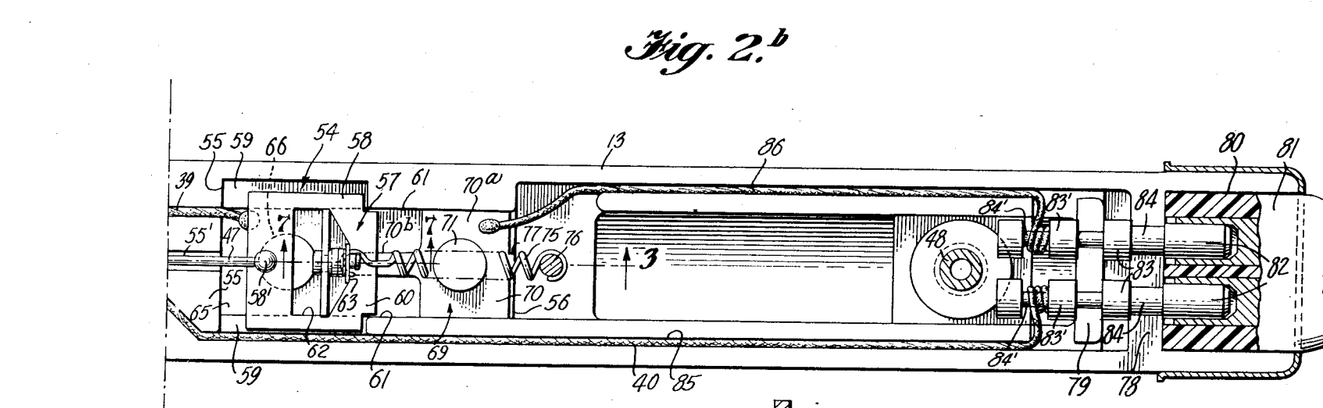

The external leads 39 and 40 of the resistance wire 38 extend from the heating element 34 through diametrically opposed openings 42 spaced from the center of and extending through a ceramic tube 43, which lies within the barrel 32 and extends from a point closely adjacent to the rearmost end of the tube 24 to a point projecting a slight distance from the remote edge of the barrel 32 lying within the handle 13. The ceramic tube 43 also has a central bore 44 extending therethrough. As illustrated in Figure 2a, annular ceramic washers or spacers of suitable dimensions may be disposed within the barrel adjacent the ceramic tube 43 to protect the leads 39, 40 from being distorted into contact with the barrel.

Slideably supported within the central bore 45 of tube 24 is a cylindrical magnet 46, which, in the preferred example, is cast from "Alnico" V and has a thin stainless steel wire forming a connecting rod 47 silver soldered to the rearmost end of the magnet 46 to extend rearwardly through the central bore 44 of the ceramic tube 43 into the handle 13.

The handle 13 is preferably formed of complementary halves 13a and 13b of molded plastic material which are held in assembled relation by means of a suitable securing element such as a hollow rivet 48 extending through suitable apertures therefor near the butt end of the handle 13 and a split ring 49 removably seated in an annular groove 50 molded in the handle 13 near the forward end thereof.

The forward end portions of the handle halves 13a, 13b are shaped to provide a cylindrical socket 51 opening through the forward end thereof and complementing the rearmost end portion of the barrel 32 to receive the rearmost end of the barrel 32 in tightly seated relation therewith, the diametrically opposite surface portions of the socket 51 having bosses 52 of circular outline to project into complementary openings in the barrel 32 to hold the barrel 32 against rotation about its axis and against axial withdrawal from the socket 51. The socket 51 has a constricted extension 53 at its rearmost end complementing the projecting end portion of the ceramic tube 43.

Spaced rearwardly along the handle 13 from the end wall of the socket extension 53 is an elongated chamber 54 for the control switch mechanism, the chamber 54 being bounded at its forward end by a wall portion 55 separating the chamber 54 from the socket 51 and having a groove 55' therein providing a clearance hole for the connecting rod 47 and bounded at the other end by a shallow wall portion 56.

The control switch unit, generally indicated by the reference character 57, includes an armature 58, formed into a flat plate of insulating material, for example from phenol laminations, the lateral edges of which are slidably supported in a longitudinal plane in guide grooves 59 formed by rabbets in the mating handle halves 13a and 13b. The armature 58 has a rearwardly projecting tongue formation 60 which extends between the wall portions 61 of the handle 13, and has an opening 62 having a bounding edge 63 at the rearmost edge of the opening 62. The armature 58 is secured to the rearmost end of the control rod 47 from the magnet 46 as indicated at 58'. A stationary contact member 64 which may be formed of .020 brass having a base flange 65 apertured to receive and to be anchored by an anchoring stud 66 molded in the plastic handle 13 includes an upright leg 67 which projects through the opening 62 in the armature 58 and has a contact button 68 secured to the leg 67 near the upper end of the leg. A movable contact member 69 cooperates with the stationary contact 64 to control the electrical supply circuit to the heating element. The movable contact member 69 may be formed, for example, from beryllium copper having a thickness of about .005, and includes a base flange 70 having a generally rectangular region 70a including an aperture for mounting the contact 69 on the anchoring stud 71 of the plastic handle 13 and a laterally constricted portion 70b projecting forwardly from the rectangular portion 70a. The movable leg 72 rises integrally from the forward end of the constricted portion of 70b through the opening 62 in the armature 58 and supports the contact button 73 near the upper end thereof. The contact buttons 73 and 68 may be formed of silver or other suitable highly conductive material. The vertical leg 72 of the movable contact 69 is provided with notches 74 in its lateral edges at an intermediate point along the leg 72 into which the hook end of the coil spring 75 projects, the other end of the coil spring 75 being secured to an anchoring post 76, fixed to the housing halves 13a, 13b. The hook of the spring 75 at the contact 69 is very close to the armature 58 so that the spring and magnet forces are almost in line, and tends to hold the armature in the side of the handle 13 to which the switch parts are attached.

In one preferred example, the constricted portion 70b of the movable contact member 69 is about .060 inch wide and .230 inch long and the rearmost edge of the rectangular portion 70a is interrupted by an integral rearwardly projecting tail piece 77 which extends about .005 inch to the rear. In the exemplary embodiment herein described, the contact member 69 is so dimensioned that the tail piece 77 is retarded by the plastic wall 56 at the rear end of the switch chamber 54 as the portions of the rectangular portion 70a bounding the opening therein are jammed down on the plastic stud 71 and against the floor of the chamber 54 and thereby cause the rearmost portion of the base flange 70 to be bowed slightly upwardly off of the floor of the chamber 54. In this preferred embodiment, the notches 74 in the leg 72 have a radius of .031 inch, are located .190 inch above the bottom surface of the base flange 70, and are spaced to provide a minimum leg width of .035 inch between the notches.

The butt end portion of the handle 13 may be provided with a protective metallic ferrule to minimize chipping of the plastic and is provided with spaced transverse partitions 78, 79 providing a groove therebetween, and a socket 80 opening through the butt end of the handle for accommodating a female plug 81 of a supply cord. A pair of male plug pins 82 are provided with suitable annular flange formations 83 projecting into the groove between the partitions 78, 79 and bounded by constricted diameter regions 84 corresponding in length to the width of partition 78 and fitted into complementary semicylindrical grooves in the partition 78 to anchor the pins 82 in position. The pin 82 may have additional collars 83' and intervening constricted regions 84' projecting inwardly of the partition 78.

The lead 40 from the heating element 34 extends from the exit end of associated opening 42 in the ceramic tube 43 through a channel 85 in the handle 13 and is soldered to the inner end portion of one of the pins 82. The lead 39 is soldered to the base flange 65 of stationary contact member 64, and a lead 86 is soldered at one end to the base flange 70 of movable contact member 69 and at its other end to the other plug pin 82, thus placing the switch 57 in series in the energizing circuit of the heating element.

In the preferred embodiment, a metallic washer 87 is mounted on the barrel 32 and butts against the front end of the handle 13, the washer 87 preferably having a periphery of octagonal or other regular geometric configuration projected a sufficient distance from the axis of the barrel to form a rest for the iron whereby the periphery of the washer 87 and the edge of the butt end of the handle 13 form a support for the iron.

The thermomagnetic control element 20 is formed of a material which loses its permeability to a sufficient degree to permit the coil spring 75 to open the contacts of the switch 57 and break the heating element supply circuit at a selected temperature level, and begin switching the heating element between an "on" or heating phase and an "off" or de-energized phase. In the case of the 60 watt soldering iron example herein described, it is desired to have an idling temperature within or near the upper limit of the range of 600° F. to 700° F. at which switching between "on" and "off" phases begins to provide temperature regulation when the iron is working on soldering loads within the usually expected range of loads so that the tip temperature remains within the range of 600° F. to 700° F. In this manner, control of the working temperature of the soldering tip can be achieved for reliable jointure of the metals to be soldered. A thermomagnetic material should therefore be chosen which will so reduce the magnetic force on the magnet 46 as to cause the spring 75 to open the switch contacts preferably near the upper limits of the temperature range of 600° F. to 700° F. While some flexibility may be exercised within the skill of the metallurgical and alloying arts in the selection of the specific thermomagnetic material for the control element 20, materials such as Monimax produced by Allegheny-Ludlum Steel Corp. (48% nickel, 3% molybdenum, remainder iron), or nickel-iron alloys having about 43% substantially pure nickel and the balance iron may be used. It is important, however, that the traces of other elements in the nickel constitutent of such a nickel-iron alloy which may affect the permeability or other properties, such as carbon, sulphur and oxygen, not exceed such limits as to significantly alter the thermomagnetic properties.

The thermomagnetic control element 20 should have an intimate, interference fit with the bore extension 18 so as to provide a good thermal path for the heat between the soldering tip 11 to the control element 20 in each direction. For example, the constricted bore extension 18 may have an actual diameter of .247 inch produced by .246 inch drill and the control element 20 in the larger diameter portion 21 thereof have a diameter of .2485–.249 inch and be driven into the constricted bore portion 18. The flat or rearmost end of the control element 20 should preferably not extend more than 1/32 inch rearwardly of the juncture between the bore extension 18 and the larger bore 17 to provide the desired reliable response to temperature changes in the soldering tip and control of the magnet 46.

When the temperature of the soldering tip 11 is below the temperature at which it is desired to automatically open the switch 57, which will be hereinafter referred to as the "control point," the magnetic force between the magnet 46 and the thermomagnetic control element 20 is sufficient to hold the magnet 46 against the cap 27. The armature 58 secured to the control rod 47 extending from the magnet 46 is therefore held at its forwardmost position, wherein the edge 63 thereof bears against the rear face of the movable leg 72 of the movable contact member 69.

Figure 3:
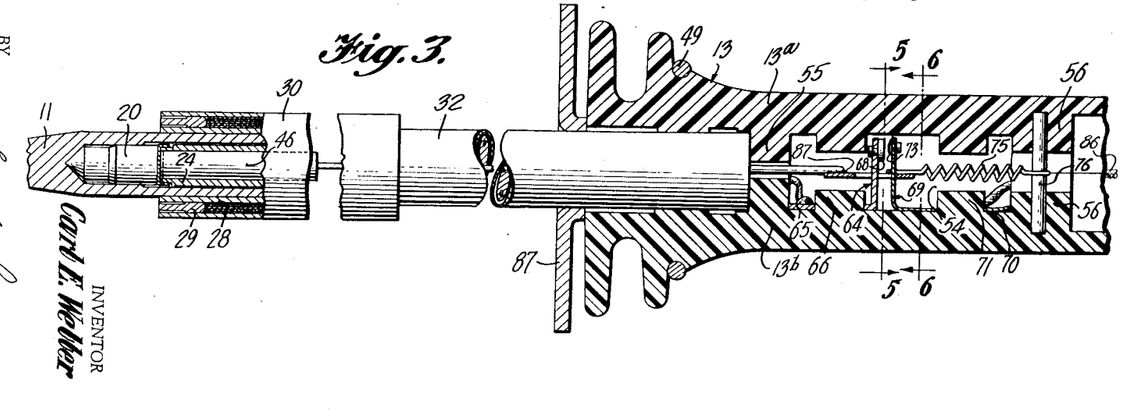
Figure 3 is a fragmentary longitudinal section view taken along the line 3—3 of Figure 2.
Figure 4:
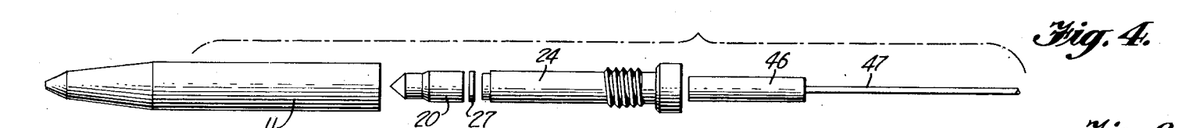
Figure 4 is an exploded elevation view of the soldering tip and the elements which extend within the soldering tip.

As is illustrated in Figures 3 and 7, the edge 63 of the armature 58 engages the movable contact member leg 72 immediately below the level at which the hooked end of the coil spring 75 is connected to the leg 72 at the notches 74. The leg 72 of the contact member 69 is initially adjusted so that it assumes a free position (before assembly of the armature 58 and the coil spring 75 therewith) wherein a clearance of about .004 to .005 inch is provided between the faces of the contact buttons 68, 73. The magnet 46 and therefore the armature 58, will preferably have a full stroke of about .015 inch, the rearmost limit of the stroke being determined by abutment of the armature 58 with the forwardly facing shoulders of the walls 61 of the handle 13. The range of movement of the movable leg 72 of contact member 69 is such as to provide a spacing of about .021 inch between the faces of the contact buttons when the switch is fully opened. The adjustment is such, however, that the contact button 73 of the movable leg 72 contacts the contact buttons 68 of the stationary leg 64 when it has travelled through about two-thirds of its total range of movement in response to the stroke of the magnet, the remaining one-third of the stroke of the magnet being devoted to producing over-travel of the lower portion of the leg 72 relative to the upper portion to bow the central portion inwardly as illustrated in Figure 7.

The notches 74 are provided in the movable leg 72 to weaken the leg sufficiently to give the slight over-travel of the bottom relative to the top, this expedient being employed rather than providing thinner material so as to preserve the desired electrical conductivity, and to position the spring 75 so that it does not move vertically away from the selected point of application of spring force. The notches are to minimize change in the return force attributed to the leaf spring leg 72 as it is drawn back to cause as little change in the loading in the spring as possible.

The coil spring 75 may, for example, be formed of twenty active coils having an outer diameter of 1/8 inch formed of .007 inch diameter stainless steel wire and in any event should have a force of 20 grams, at the switch when the switch is in closed position, the design being preferably such that the change in force when the switch shifts to open position is not more than 1–1½ grams.

It will be thus seen that when the temperature of the tip 11 reaches the desired control point, for example 675° F., the magnetic attraction between the magnet 46 and control element 20 will have so diminished that the spring 75 will be capable of opening the switch 57. During the first approximately 1/3 portion of the rearward stroke of the armature 58, however, the leg 72 merely straightens out from its bowed condition illustrated in Figure 7, producing movement of the contact button 73 relative to the fixed contact button 68 in a direction perpendicular to the axis of the spring 75 and handle 13, for providing a wiping action at the faces of the contact buttons which serves to break any weld which may have formed between the contact buttons. During the remaining rearward stroke of the armature 58, the spring 75 draws the upper end portion of the movable contact leg 72 rearwardly to the position illustrated in Figure 8. The force of the resilient leg 72 and the thin constricted portion 70b of the movable contact member 69 opposes the force of the coil spring 75 with a force of about 4 grams, and since the contraction of the spring 75 will not have reduced its force by more than 1–1½ grams, the magnet 46 need only overcome about 15 grams force to return the switch to closed condition. Upon the return stroke of the armature 58 when the magnet 46 is again attracted to the left hand position illustrated in Figure 2a by reduction in temperature communicated to the control element 20, the first two-thirds, approximately, of the stroke of the armature is utilized in drawing the contact button 73 into contact with the fixed button 68 and the remaining one-third of the stroke bows the leg 72 forwardly, as illustrated in Figure 7.

It will be recognized that uncontrolled soldering irons, wherein the heating element is always operating at full capacity and radiation losses are relied upon to establish an idling temperature, experience a drastic reduction in temperature when the tip is loaded by work as the radiation losses which must be supplied by the heating element continue. Unlike such uncontrolled soldering irons, the present soldering iron temperature is maintained within a narrow band at the optimum soldering temperature because the automatic temperature regulating facility is arranged to energize the heating element only about 30 to 40 percent of the time when the soldering iron is at unloaded idling temperature. The radiation losses are exceedingly small because of the small size and design of the tool, and the reduction in temperature of the tip when it becomes loaded increases the proportional time that the heating element is energized to supply greater heating to the soldering tip and thereby maintain the soldering tip in the desired temperature range.

As was previously mentioned, the heating element is wound so as to provide a non-inductive winding, to avoid deposits which would shorten switch life. If the winding were inductive, its field would aid and oppose the holding action between the magnet and thermomagnetic element on successive half cycles. This would cause the contact to break at the peak of the current wave in the "oppose" direction. This is the worst possible time and direction of current flow is always the same, leading to unidirectional metal transfer in one direction as with a D.-C. circuit. If a non-inductive winding is used this field is negligibly small and break point is truly random, occurring in either half cycle and not necessarily at a current maximum. Hence deterioration of contact points is less.

It will be noted that the tube 24, element spool 28, element cover 30 and barrel 32 are all made of stainless steel instead of the mild steel used in most commercial soldering irons, thus providing about one-fifth the thermal conductivity of the former barrels and permitting these elements to be smaller size and mass while preserving the necessary strength. This permits greater relative utilization of the heat energy at the soldering tip and less useless dissipation of the energy through radiation losses from large masses in the barrel and heating element regions.

As previously mentioned, the preferred embodiment described above is of a soldering iron having a 60 watt rating. Another embodiment, having a rating of 120 watts, suitable for heavier soldering loads, may be produced generally in keeping with the construction described above but wherein the dimensions of the elements are increased somewhat to accommodate a larger size soldering tip and a larger heating element. In the 120 watt embodiment, the heating element may be formed of two layers of No. 29 B & S gauge Nichrome wire having 64 turns per layer and a pitch of about 40 turns per inch. In such an embodiment, the handle is of considerably larger diameter than the handle 13 described in connection with the 60 watt embodiment, and the wells provided in the mating halves of the handle to form the switch chamber 54 are preferably deeper than those in the first described embodiment.

Figures 13, 14:
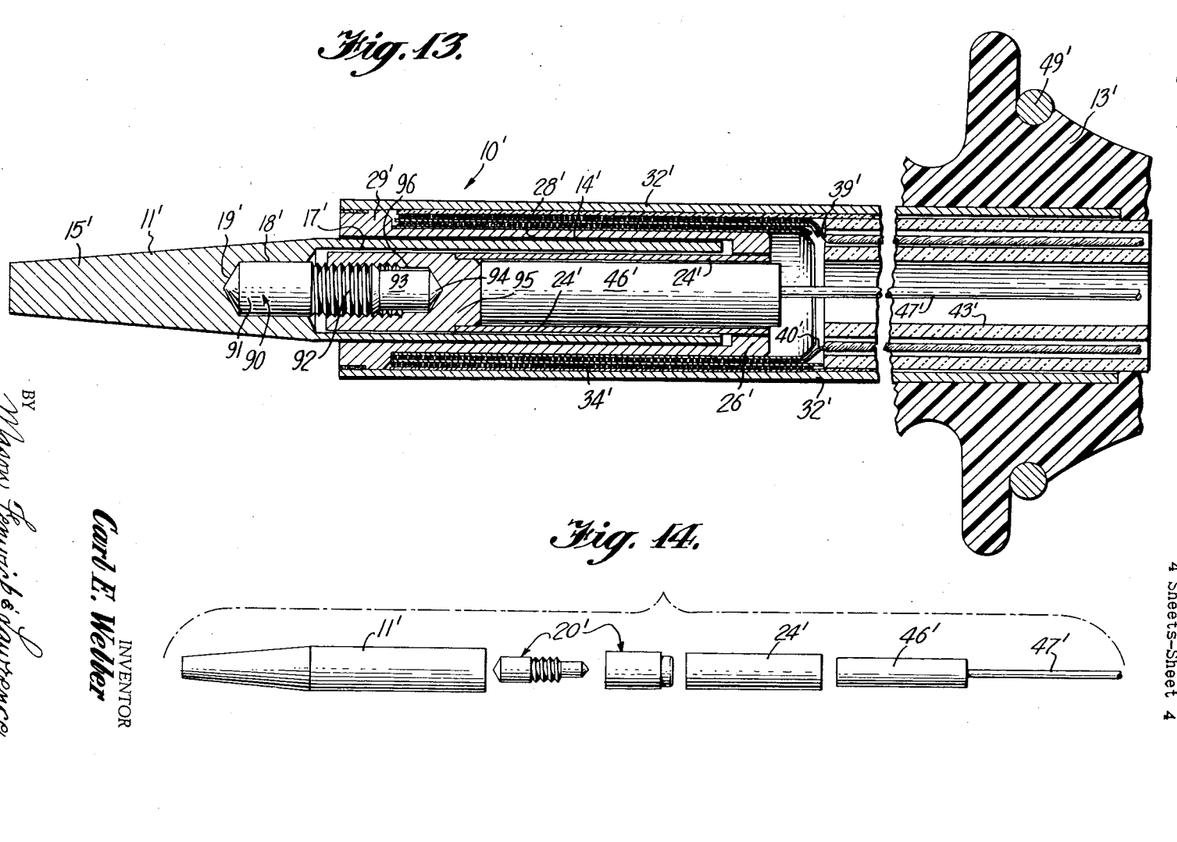
Figure 13 is an enlarged fragmentary longitudinal section view of elements of a modified form of soldering iron embodying the present invention.
Figure 14 is an exploded view of the soldering tip and the elements which project into the soldering tip of the embodiment illustrated in Figure 13.

A still further modification is illustrated in Figures 13 and 14. This modification is an embodiment of a miniaturized soldering iron having, for example, a 40 watt rating, which is designed to be especially suitable as a printed circuit tool for soldering connections on printed circuits. In this embodiment, the soldering tip 11' may have a diameter of about .260 inch and a length of about 1⅞ inches and is formed with a cylindrical body portion 14' which may be about 15/32 inches long and a tapered working end portion 15'. The soldering tip 11' is provided with a bore 17' opening through the rearmost end thereof and extending substantially coextensive with the cylindrical body portion 14', and a constricted bore extension 18' terminating forwardly in a conical base 19'. Because of the miniaturization of the soldering tip 11' in this embodiment, the parts are too small to provide for the threaded assembly of the heating element and barrel portions of the tool with the soldering tip in the manner described in connection with the first embodiment. The thermomagnetic control element, generally designated by the reference character 20' in this embodiment, is altered slightly in construction by providing a member 90 which is stationary relative to the tip 11'. The member 90 may be formed of No. 6 nickel wire, or of thermomagnetic material similar to that of element 20 having a suitable control point, or of highly thermally conductive material of suitable hardness and durability, having a generally cylindrical forward portion 91 which is of slightly larger diameter than the diameter of the constricted bore extension 18' driven into the bore extension 18' to form a tight interference fit therewith, an externally threaded intermediate portion 92 and a constricted diameter rear portion 93 terminating in a conical end 94. Threadedly assembled with this stationary control element portion 90 is a thermomagnetic control member 95 formed of a material similar to that of the thermomagnetic control element 20 in the first embodiment. The member 95 is provided with a bore 96 for accommodating the portions 92 and 93 of the member 90, the bore having an internally threaded entrance portion which is threaded to the threaded intermediate portion 92 of the member 90 and the base of the bore 96 being intimately driven against the conical end 94 of the element 90 when the elements 95 and 90 are threadedly assembled. A thin inner tube 24' is brazed along its internal surface to the rearmost end of the thermomagnetic control member 95 and has brazed to its rearmost end an element spool 28' which, in this embodiment, has an integral inwardly extending bushing portion 26' at its rearmost end and an integral outwardly extending bushing portion 29' at its forward end. The heating element 34' consisting of sandwiched mica sheets and inner and outer winding layers similar to that described in connection with the first embodiment is formed upon the element spool 28', and may be formed of No. 37 B & S gauge Nichrome V wire having 44 turns per layer and a pitch of 64 turns per inch. Because of the small size of the heating element 34' in this embodiment, it is unnecessary to provide an enlarged diameter cover portion over the region of the heating element. Thus, in this embodiment, the barrel 32' forms the cover for the heating element 34' and is brazed at its forward end to the bushing 29' of the element spool 28'. The barrel also houses a ceramic tube 43' similar to that described in the first embodiment, accommodating the leads 39' and 40' extending from the heating element to the handle 13' and the control rod 47' extending from the axially slideable magnet 46' located within the inner tube 24'. This embodiment will have a control switch which is identical to that described in connection with the first embodiment so that the description of the details of the control switch construction and the electrical circuitry need not be repeated here.

The soldering irons referred to as the 60 watt and 120 watt ratings are constructed in such a way that they are readily adapted to permit interchangeable soldering tips having different control points to be assembled with the other soldering iron elements. Since the thermomagnetic element is preassembled with the soldering tips at the factory and this soldering tip and control element unit is readily removable from the iron, the user may have a plurality of different soldering tips for each soldering iron, which have different control points as determined by the thermomagnetic element provided in the tip, for example, one 600° F. control point tip, one 700° F. control point tip and one 800° F. control point tip, so that the user may readily assemble the tip having the desired control point with the iron to suit the particular work conditions with which he is faced.

While several embodiments of the invention have been shown and described, it is apparent that other modifications may be made in the invention without departing from the spirit and scope thereof, and it is desired, therefore, that only such limitations shall be placed thereon as are imposed by the prior art and are set forth in the appended claims.

What is claimed is:

1. In an electrically heated soldering iron having a highly thermally conductive, elongated soldering tip having an outer working end and an inner end remote from said working end, an electrically energized heating element surrounding said inner end of said soldering tip in encasing relation therewith for delivering heat to the soldering tip, said soldering tip having an elongated bore therein of generally cylindrical configuration opening through the inner end thereof, means for automatically regulating the temperature of the soldering tip to establish a selected idling temperature and maintain the soldering tip temperature while working under load within a range of about 100° F. of said idling temperature comprising a thermomagnetic element in the form of a generally cylindrical integral solid body conforming to the cross section of said bore in the forwardmost region of said bore and seated in the forwardmost end of said soldering tip bore in intimate physical and thermal contact therewith, said thermomagnetic element having a permeability which varies upon variation in its temperature, a magnet supported for axial movement along the axis of said soldering tip between a proximate position and a relatively remote position relative to said thermomagnetic element, a switch having contacts for regulating the energizing current supplied to said heating element, and control means for said switch for opening and closing said contacts including means responsive to the position of said magnet, said magnet being positioned by its magnetic coupling with said thermomagnetic element at said proximate position when the temperature of said soldering tip is below a selected idling temperature to hold said switch contacts in closed condition and being released to said relatively remote position when the temperature of said soldering tip is above said idling temperature, and said control means including means positioning said switch contacts in open circuit condition when said magnet occupies said relatively remote position.

2. A temperature regulated soldering iron comprising a generally tubular electrical heating element, a highly thermally conductive elongated soldering tip having a cylindrical body portion substantially encased in concentric relation within said heating element and a tapered working end portion projecting forwardly from the end of said heating element, a switch for regulating the electrical supply to said heating element, said soldering tip having a bore opening through the end thereof remote from said working end portion and extending into said working end portion, a thermomagnetic element seated in said soldering tip bore at the end thereof adjacent said working end portion, said thermomagnetic element having a permeability which varies upon variation in its temperature, an elongated guide tube at least partially within said soldering tip bore and extending away from the working end thereof, said guide tube having a guide bore therein extending in concentric relation with the axis of said soldering tip; a magnet slidably supported within said guide bore for axial reciprocation within said soldering tip bore from a first position immediately adjacent said thermomagnetic element to a second position spaced rearwardly therefrom, a switch for controlling the energizing current supplied to said heating element having a movable contact arm, means intercoupling said movable contact arm with said magnet for holding said switch in closed circuit condition when said magnet occupies said first position in response to the permeability of said thermomagnetic element for temperatures below a selected idling temperature for said soldering tip, means normally urging said movable contact arm to open circuit condition and urging said magnet away from said first position toward said second position to overcome the magnetic attraction between said magnet and said thermomagnetic element when the soldering tip temperature is at a level above said selected idling temperature to de-energize said heating element during said period.

3. An electric soldering iron comprising an elongated soldering tip having an outer working end, an inner end remote from said working end, and an elongated, generally cylindrically bore opening through said inner end, an electrically energized heating element for delivering heat to said soldering tip surrounding said inner end of said soldering tip in encasing relation therewith, a thermomagnetic element in the form of a solid body in the general configuration of a cylinder positioned to be heated in response to the temperature of said soldering tip, said thermomagnetic element having a permeability which varies upon variation in its temeprature and being seated within the forwardmost end portion of said bore with the cylindrical surface of the thermomagnetic element in intimate physical and thermal contact substantially throughout the extent thereof with the adjacent surface of said bore, a magnet supported for movement axially along the axis of said soldering tip and relative to said thermomagnetic member from a first position proximate to said thermomagnetic element through a range of movement extending away from said thermomagnetic element, a switch disposed rearwardly of said magnet in a direction away from said soldering tip for regulating energizing current applied to said heating element including a stationary contact and a contact member having a flexible contact arm shiftable from a circuit closing condition relative to said contact to a circuit opening position, a spring coupled to said flexible contact arm for resiliently biasing said contact arm away from said contact to circuit opening position, a control member movable with said magnet engaging said contact arm and communicating the resilient bias thereon to said magnet to urge the same away from said first position for forcing the contact arm into circuit closing relation with said contact when the magnetic force between said thermomagnetic element and said magnet is above a selected level and for releasing said contact arm to respond to said spring to assume said circuit opening position when said magnetic force is below said selected level.

4. An electric soldering iron comprising a soldering tip, an electrically energized heating element for delivering heat to said soldering tip, a thermomagnetic element positioned to be heated in response to the temperature of said soldering tip, a magnet supported for movement relative to said thermomagnetic member from a first position proximate to said thermomagnetic element through a range of movement extending away from said thermomagnetic element, said thermomagnetic element having a permeability which varies upon variation in its temperature to provide a magnetic force between said magnet and said thermomagnetic element which diminishes as the temperature of said thermomagnetic element increases, a switch for regulating energizing current applied to said heating element including a stationary contact member and a movable contact member disposed relatively more remote from said magnet having a fixed base and a flexible contact arm extending from said base, said flexible contact arm having a free end remote from said base carrying a contact and an intermediate zone located in the central region of said contact arm between said free end and said base said contact arm being flexible relative to said base between a circuit closing position and a circuit opening position with respect to said fixed contact member, a spring coupled to said flexible contact arm at an intermediate point along said arm and a fixed anchor for resiliently biasing said contact arm away from said fixed contact member to said circuit opening position, a control rod fixed to said magnet and extending therefrom having a terminal member positioned to engage said contact arm in said intermediate zone of said contact arm and transmit the resilient bias thereon to said magnet to resiliently urge the magnet away from said first position for withdrawing said magnet away from said first position when the magnetic force between said thermomagnetic element and said magnet is below a selected level denoting a selected idling temperature for said soldering tip and releasing said contact arm to be withdrawn by said spring to circuit opening position, said terminal member of said control rod being adapted to draw said flexible contact arm into circuit closing position against the resilient bias of said spring in response to attraction of said magnet toward said first position when said magnetic force is above said selected level and said magnet, control rod and terminal member having a selected amount of over travel upon movement of the magnet toward said first position to cause the terminal member to bow the contact arm in the intermediate zone thereof to provide wiping action between the contacting surfaces and the stationary and movable contact members.

5. An electric soldering iron comprising a soldering tip, an electrically energized heating element for delivering heat to said soldering tip, a thermomagnetic element positioned to be heated in response to the temperature of said soldering tip, a magnet supported for movement relative to said thermomagnetic member from a first position proximate to said thermomagnetic element through a range of movement extending away from said thermomagnetic element, said thermomagnetic element having a permeability which varies upon variation in its temperature to provide a magnetic force between said magnet and said thermomagnetic element which diminishes as the temperature of said thermomagnetic element increases, a switch for regulating energizing current applied to said heating element including a stationary contact member and a movable contact member disposed relatively more remote from said magnet having a fixed base and a flexible leaf spring contact arm bent at right angles to and extending from said base, said leaf spring contact arm being flexible relative to said base between a circuit closing position and a circuit opening position with respect to said fixed contact member, a spring coupled to said flexible contact arm at an intermediate point along said arm and a fixed anchor for resiliently biasing said contact arm away from said fixed contact member to said circuit opening position, a control rod fixed to said magnet and extending therefrom having a terminal member positioned to engage said contact arm in the intermediate region of said contact arm and transmit the resilient bias thereon to said magnet to resiliently urge the magnet in a direction to withdraw it away from said first position when the magnetic force betwen said thermomagnetic element and said magnet is below a selected level denoting a selected idling temperature for said soldering tip and releasing said contact arm to be withdrawn by said spring to circuit opening position, said terminal member of said control rod being adapted to draw said flexible contact arm into circuit closing position against the resilient bias of said spring in response to attraction of said magnet toward said first position when said magnetic force is above said selected level.

6. An electric soldering iron comprising a soldering tip, an electrically energized heating element for delivering heat to said soldering tip, a thermomagnetic element positioned to be heated in response to the temperature of said soldering tip, a magnet supported for movement relative to said thermomagnetic member from a first position proximate to said thermomagnetic element through a range of movement extending away from said thermomagnetic element, said thermomagnetic element having a permeability which varies upon variation in its temperature to provide a magnetic force between said magnet and said thermomagnetic element which diminishes as the temperature of said thermomagnetic element increases, a switch for regulating energizing current applied to said heating element including a stationary contact member and a movable contact member disposed relatively more remote from said magnet having a fixed base and a flexible leaf spring contact arm bent at right angles to and extending from said base, said leaf spring contact arm being flexible relative to said base between a circuit closing position and a circuit opening position with respect to said fixed contact member, a spring coupled to said flexible contact arm at an intermediate point along said arm and a fixed anchor for resiliently biasing said contact arm away from said fixed contact member to said circuit opening position, a control rod fixed to said magnet and extending therefrom having a terminal member adapted to engage said contact arm in the intermediate zone of said contact arm and transmit the resilient bias thereon to said magnet to resiliently urge the magnet in a direction to withdraw it away from said first position when the magnetic force between said thermomagnetic element and said magnet is below a selected level denoting a selected idling temperature for said soldering tip and releasing said contact arm to be withdrawn by said spring to circuit opening position, said terminal member of said control rod being adapted to draw said flexible contact arm into circuit closing position against the resilient bias of said spring in response to attraction of said magnet toward said first position when said magnet force is above said selected level, said flexible contact arm being shifted in response to movement of said terminal member of said control rod first in the zone of the bend at the juncture of said contact arm and said base from said circuit opening position to an initial point of contact between said contact arm and said stationary contact member and being then bowed in the intermediate zone of said contact arm by flexing of the contact arm upon a selected over travel of said terminal member to provide wiping action between the contact faces of said stationary and movable contact members.

7. In electrical heating apparatus, an electrically energized heating element including helical windings forming a cylindrical coil having an axial bore, Curie point control means for regulating electrical energization of said heating element in response to the temperature of said control means, said control means including a movable magnet disposed for rectilinear reciprocative movement along the axis of said bore through a range lying within said cylindrical coil and a switch interposed in the energizing circuit of said heating element and mechanically linked to said magnet to be shifted to circuit making and circuit breaking position by movement of said magnet, said heating element windings including a first winding layer wound in one direction and a second winding layer wound in the opposite direction to cancel the flux produced by the first winding layer and provide a non-inductive heating element and thereby magnetically decouple the closely adjacent magnet and heating element.

8. A temperature regulated soldering iron comprising a generally annular electrical heating element having an inner cylindrical wall, an inner guide tube coaxially disposed within said annular heating element having a guide bore extending therethrough in alignment with the axis of said heating element, said inner guide tube having an outer cylindrical surface defining with said inner wall of said heating element an annular recess extending through the major portion of the length of said heating element and opening forwardly thereof, a highly thermally conductive elongated soldering tip having a tapered working end portion projecting forwardly from said heating element and a rearwardly extending cylindrical body portion having a rearwardly opening bore extending substantially through said cylindrical body portion to accommodate said inner guide tube, the bored cylindrical body portion of said soldering tip being adapted to be removably inserted into said forwardly opening annular recess and having means for removably coupling the same with said inner guide tube to support the soldering tip therefrom, an elongated handle disposed rearwardly of said heating element and a tubular barrel rigidly connecting said heating element with said handle, said heating element, barrel and handle being in axial alignment with each other, said soldering tip further having a control element seating bore portion at the forward end thereof communicating with said rearwardly opening bore, a thermomagnetic control element seated in said control element seating bore portion in intimate physical and thermal contact with said soldering tip adjacent the tapered working end portion thereof, said thermomagnetic control element having a permeability which varies upon variation in its temptrature, a generally cylindrical magnet conforming substantially to the diameter of the guide bore in said inner guide tube and slidably supported therein for rectilinear reciprocation along the axis of said soldering tip and guide bore from a first position immediately adjacent said thermomagnetic element to a second position spaced rearwardly therefrom, a switch within said handle for controlling the energizing current supplied to said heating element having a movable contact arm, means rigidly interconnecting said movable contact arm with said magnet for positioning said movable contact arm to position said switch in closed circuit condition when said magnet occupies said first position in response to the permeability of said thermomagnetic element below a selected idling temperature for said soldering tip, and means exerting a force on said movable contact arm to shift the same to open circuit condition and draw said magnet away from said first position toward said second position to overcome the magnetic attraction betwen said magnet and said thermomagnetic element when the soldering tip temperature is at a level above said selected idling temperature for de-energizing said heating element while said contact arm is in open circuit condition.

9. A temperature regulated soldering iron comprising a generally tubular electrical heating element having an axial bore therein, a highly thermally conductive, elongated soldering tip having an inner end encased with the bore of said heating element in concentric relation therewith and an exposed outer working end spaced forwardly of said heating element, a switch for regulating the electrical supply to said heating element, control means for said switch including biasing means normally urging said switch to open circuit condition and a magnet intercoupled with said switch and slidably supported within the bore of said heating element for reciprocative movement along the axis thereof, said soldering tip having a bore opening through the inner end thereof, and a thermomagnetic control element consisting of a solid body of material having a permeability which varies upon variation in its temperature, said solid body having a cross section conforming substantially to the cross section of the bore of said soldering tip and being seated in said bore of said soldering tip in intimate physical and thermal contact with the internal surfaces of said bore at the end of said bore nearest said working end of the soldering tip, said control element being magnetically coupled with said magnet for attracting said magnet to a position which retains said switch in closed circuit condition when the temperature of the soldering tip is below a selected idling temperature range and for reducing the coupling force with said magnet when said soldering tip reaches said idling temperature range to release said switch to open in response to said biasing means to reduce the supply of heat from said heating element to said soldering tip.

10. A temperature regulated soldering iron comprising a generally tubular electrical heating element, a highly thermally conductive elongated soldering tip having a cylindrical body portion substantially encased in concentric relation within said heating element and a tapered working end portion projecting forwardly from the end of said heating element, a switch for regulating the electrical supply to said heating element, said soldering tip having a bore opening through the end thereof remote from said working end portion and extending into said working end portion, a thermomagnetic element in the form of a solid body having a cross section conforming to the cross section of the forwardmost part of said soldering tip bore seated in said soldering tip bore at the end thereof adjacent said working end portion, said thermomagnetic element having a permeability which varies upon variation in its temperature, a magnet slidably supported for reciprocation along the axis of said soldering tip bore from a first position immediately adjacent said thermomagnetic element to a second position spaced rearwardly therefrom, a switch for controlling the energizing current supplied to said heating element having a movable contact arm, means intercoupling said movable contact arm with said magnet for holding said switch in closed circuit condition when said magnet occupies said first position in response to the permeability of said thermomagnetic element for temperatures below a selected idling temperature for said soldering tip, means normally urging said movable contact arm to open circuit condition and urging said magnet away from said first position toward said second position to overcome the magnetic attraction between said magnet and said thermomagnetic element when the soldering tip temperature is at a level above said selected idling temperature to de-energize said heating element during said period.

References Cited in the file of this patent

UNITED STATES PATENTS

| | | |
|---|---|---|
| 1,499,112 | Lippincott | June 24, 1924 |
| 1,725,255 | Claytor | Aug. 20, 1929 |
| 1,930,638 | Barr | Oct. 17, 1933 |
| 2,207,871 | Meyers | July 16, 1940 |
| 2,341,831 | Vanatta | Feb. 15, 1944 |
| 2,540,527 | Ingels | Feb. 6, 1951 |
| 2,552,253 | Brown | May 8, 1951 |
| 2,663,785 | Graham | Dec. 22, 1953 |
| 2,735,923 | Juvinall | Feb. 21, 1956 |
| 2,751,483 | Keen et al. | June 19, 1956 |
| 2,855,495 | Grant | Oct. 7, 1958 |